Figure 1:
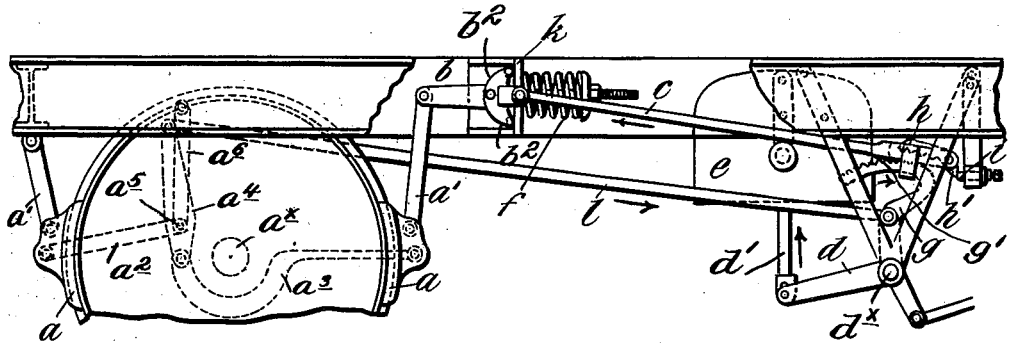

No. 864,120. PATENTED AUG. 20, 1907.
H. E. BROWN.
BRAKE MECHANISM FOR RAILWAY AND OTHER VEHICLES.
APPLICATION FILED JULY 24, 1905.

3 SHEETS—SHEET 1.

Witnesses:

Inventor
Harvey E. Brown
By
James L. Norris.
Atty.

No. 864,120. PATENTED AUG. 20, 1907.
H. E. BROWN.
BRAKE MECHANISM FOR RAILWAY AND OTHER VEHICLES.
APPLICATION FILED JULY 24, 1905.
3 SHEETS—SHEET 2.
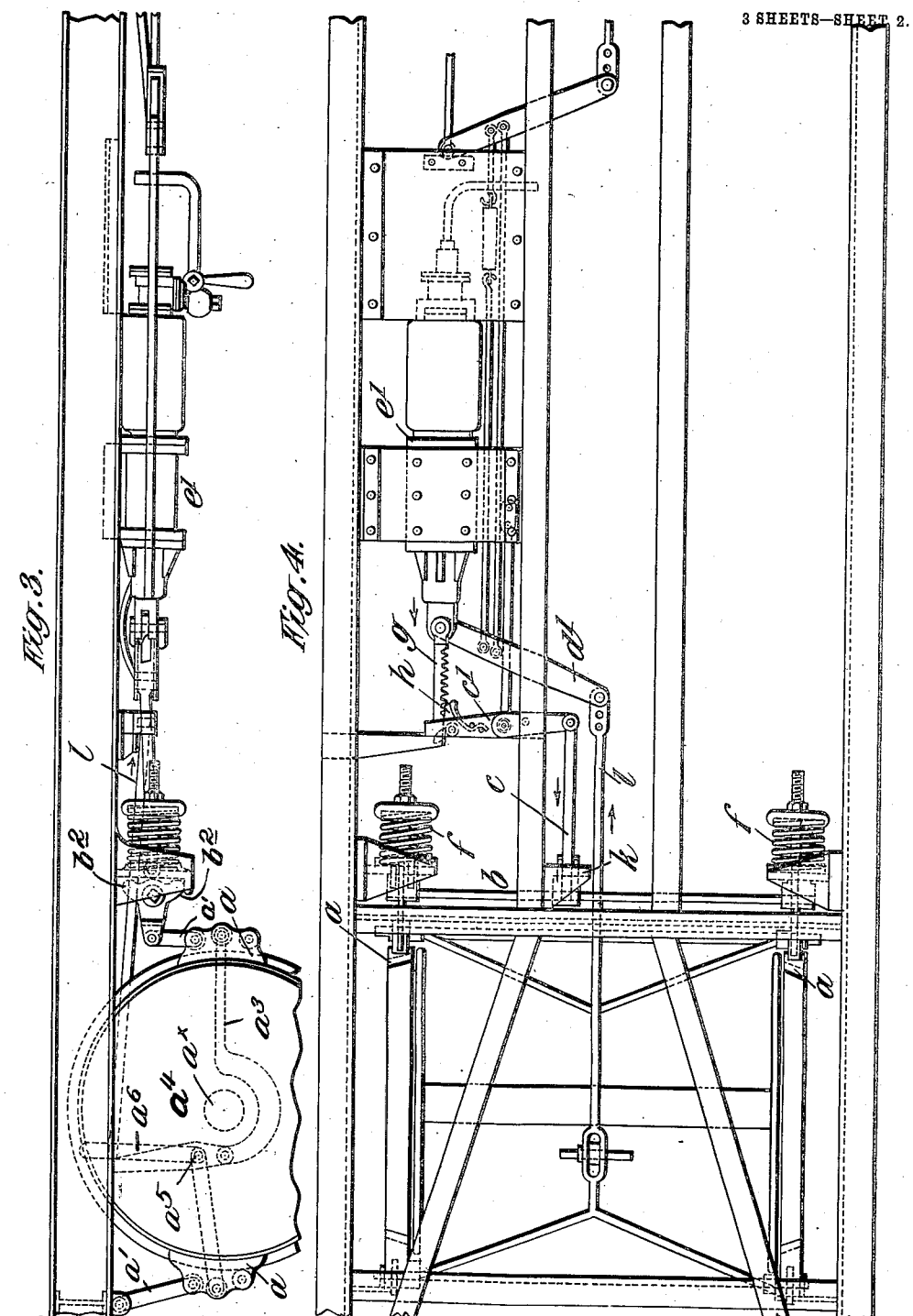

No. 864,120. PATENTED AUG. 20, 1907.
H. E. BROWN.
BRAKE MECHANISM FOR RAILWAY AND OTHER VEHICLES.
APPLICATION FILED JULY 24, 1905.
3 SHEETS—SHEET 3.
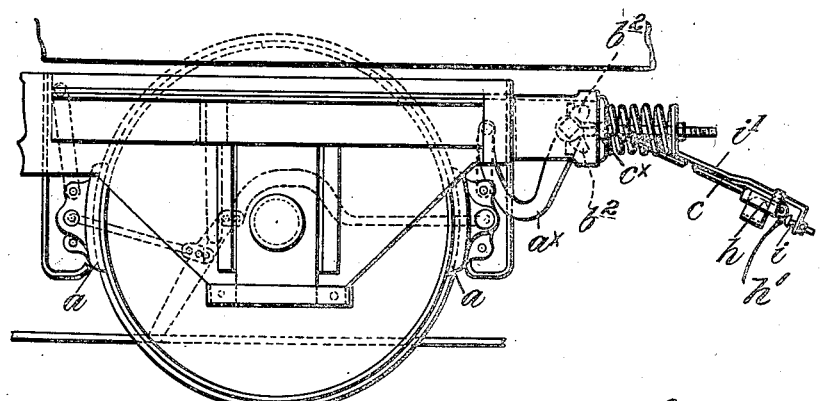
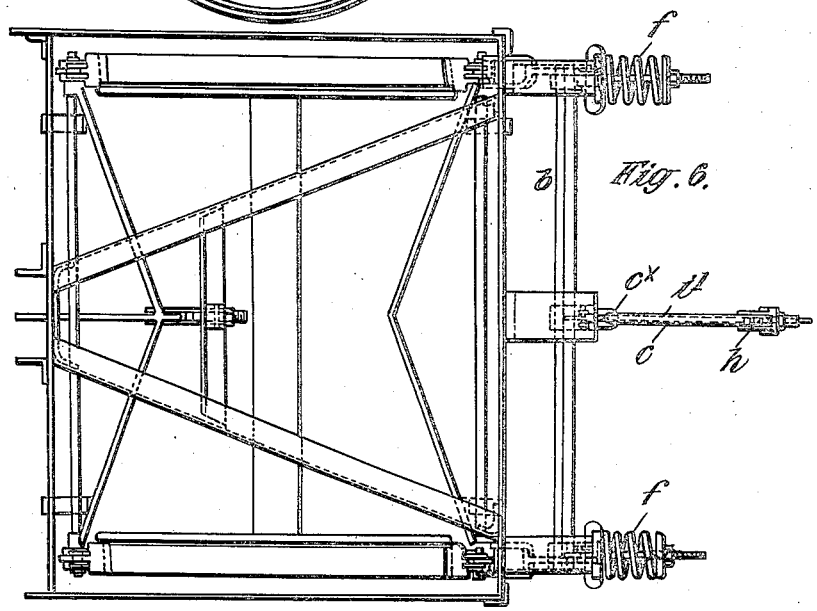
Witnesses:
Inventor
Harvey E Brown
By
James L. Norris.
Atty

UNITED STATES PATENT OFFICE.

HARVEY EZRA BROWN, OF NORBURY, ENGLAND.

BRAKE MECHANISM FOR RAILWAY AND OTHER VEHICLES.

No. 864,120.           Specification of Letters Patent.           Patented Aug. 20, 1907.

Application filed July 24, 1905. Serial No. 270,984.

*To all whom it may concern:*

Be it known that HARVEY EZRA BROWN, a citizen of the United States of America, residing at Beechcroft, London Road, Norbury, in the county of Surrey, England, consulting engineer, has invented certain new and useful Improvements Relating to Brake Mechanism for Railway and other Vehicles, of which the following is a specification.

This invention relates to brake mechanism for rail and other vehicles, more particularly adapted for employment in connection with brake systems of the "automatic" type; the object being to obtain a variable braking effect or power dependent upon and governed by the friction between the brake blocks and the wheels.

An essential feature of my invention consists in utilizing the tangential pull of the brake blocks for counteracting the direct pressure incidental to the application of the brake and thereby reducing the amount of pressure between the brake blocks and the wheels.

According to the construction of brake mechanism heretofore adopted, the braking force is usually of such an amount only that, at very slow speeds, the wheels will not be forced to skid upon the rails and is therefore wholly inadequate when the vehicle is traveling at high speeds.

It is well known that the adhesion between the wheels and the rails being a form of static friction is uniform and equal irrespectively of the speed of the vehicle; the friction between the brake blocks and the wheels being of the dynamic form and subject to variation according to the speed. Moreover, the kinetic energy to be absorbed by the brakes is greater at high speeds, due to the rotative momentum of the wheels and axles. For these reasons it is well understood that a uniform braking force, as generally employed, is extremely inefficient in practice; it being impossible with such a force to take advantage of the very low coefficient of friction at higher speeds. The extra power to absorb the rotative momentum at the same time as it takes up the direct momentum is also unavailable for effective employment. Various contrivances have been used for realizing these effects; their object being the obtaining of brake power in proportion to the coefficient of friction at the various speeds, but their action has not been altogether satisfactory; some resulting in undue waste of pressure and a jerky motion while others, the reduction of pressure being in proportion to time as distinguished from speed or the resultant coefficient of friction, when applied at slow speeds, either accidentally or through the breaking of the train, result in the skidding of the wheels and oftentimes the breaking of the couplings.

Now, according to my invention, the braking power is governed substantially by the amount of the tangential pull of the brake blocks but, instead of utilizing this force to open valves and reduce pressures, it is utilized, through leverage and suitable connections, to apply a force contrary to that exerted by the brake cylinder or other device employed in connection with the application of the braking pressure and tending to counterbalance the said force and thereby to reduce the amount available for pressure on the brake blocks.

In order that the said invention may be clearly understood and readily carried into effect I will proceed to describe the same with reference to the accompanying drawings, in which:—

Figure 2:
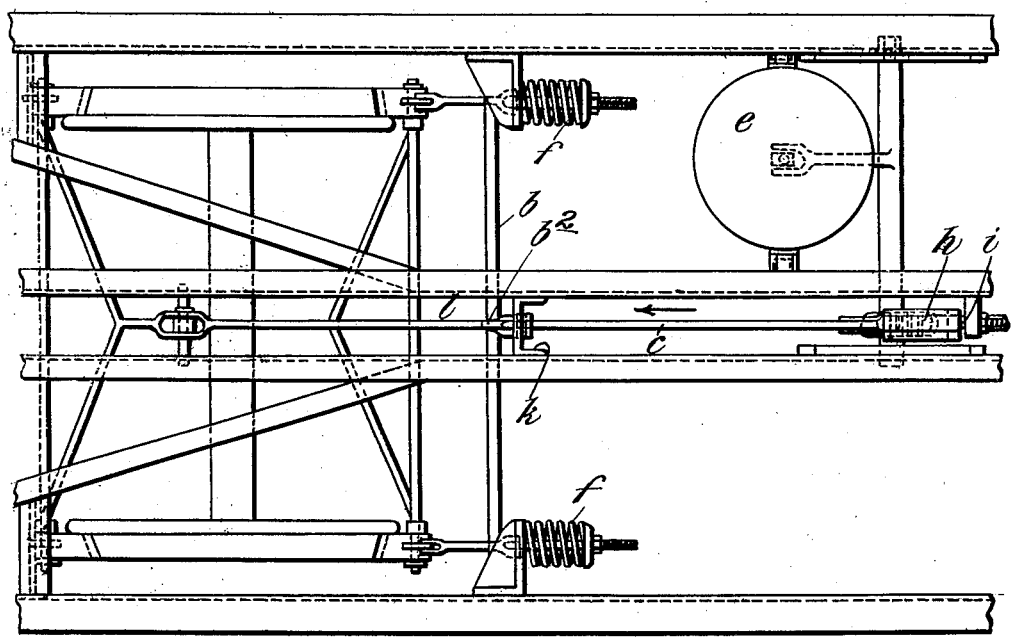

Figures 1 and 2 illustrate by way of example a mode of carrying out the invention, in which the braking force is obtained by means of a vacuum cylinder; Fig. 1 being a partial section and elevation and Fig. 2 a plan. Figs. 3 and 4 are views similar to Figs. 1 and 2 illustrating a mode of working applied to the Westinghouse system of brake. Figs. 5 and 6 are respectively a side view and a plan illustrating the apparatus applied to a bogie.

In the drawings is illustrated an example of the arrangement which is adapted for accomplishing the objects of my invention, and $a$ designates the brake blocks which are actuated through suitable connections associated with the lever $l$ for applying said brake blocks to the wheel. Pivotally connected to the brake blocks $a$ is a bar or link $a'$ which is also pivotally connected to a double bell crank lever $b$ formed with arched extremities $b^2$ which are adapted to have bearing against fixed brackets $k$ carried by the car frame. With the outermost arched extremities $b^2$ are associated springs $f$ for normally holding the bearing ends of the arched portion in contact with the brackets $k$. To the intermediate arch-shaped extremity is connected a rod $c$ having at one end a flexibly mounted toothed pawl $h$ which is provided with an extension $h'$ adapted to contact with a stop $i$ carried by the car frame, and which will hold the pawl $h$ elevated and normally from engagement with an arm $g$ of substantially quadrant shape having ratchet teeth for engagement with the said pawl. Through the medium of an arm $d$ the arm $g$ is connected to a piston rod $d'$ of a piston operative within the brake cylinder $e$. Said rod $l$ is also connected to the arm $g$.

In operation the brake blocks $a$ will be applied by a predetermined pressure exerted through the brake cylinder $e$ by the raising of the piston within the said cylinder $e$, thus pulling on the connection $d$ and causing the rocking of the quadrant arm $g$ in one direction so as to pull on the rod $l$, and should a tangential pull be exerted on the brake blocks $a$, the same will cause the link $a'$ to be moved, rocking the bell crank lever $b$ so that one extremity of the arch-shaped portion $b^2$ will fulcrum against the fixed bracket $k$, thus causing the tensioning of the spring $f$ and a pull on the rod $c$ having at one extremity the pawl $h$ with the extension $h'$ of which will disengage with the stop $i$, thereby causing the pawl $h$ to engage with the toothed quadrant arm $g$ which has connection with the brake cylinder $e$, thereby counteracting or utilizing the additional frictional force of the cylinder pressure due to the said tangential pull of the brake blocks when in frictional contact with the wheels, when the latter is in motion. When the brake pressure on the brake blocks is relieved the double bell crank lever $b$ will be brought to a normal position by having the two bearing surfaces of the arched portions $b^2$ thereof contacting with the bracket $k$, due to the relaxing of the spring $f$, and at the same time causing said rod $c$ to move a sufficient distance to bring the extension $h'$ of the pawl $h$ into contact with the stop $i$, thereby raising said pawl $h$ to disengage the same from the toothed portion of the quadrant arm $g$ so that the latter will be free for movement to allow the brake blocks to be applied through the medium of the brake cylinder.

It will be apparent that in the position illustrated the pawl $h$ is being held out of engagement by the projection or angular extension $h'$ operating against the stop $i$, this being the normal position. When, however, the brake shoes are applied to the wheel the piston rod $d'$ by moving in the direction of the arrow turns the lever $d$ about the shaft $d^{\times}$ and with the lever the arm $g$ carrying the rack $g'$ also moves past the teeth of the pawl $h$, the latter being held up or out of engagement with the rack by the extension $h'$ being forced against the stop $i$ by the springs $f$, $f$. The brake shoes $a$ are respectively suspended by the links $a'$ and in the engagement shown the blocks are connected by links $a^2$, $a^3$, to a lever $a^4$, the pivot $a^5$ of the latter being disposed in the hanger $a^6$. The link $a^3$ is bent or curved to conveniently pass beneath the wheel axle $a^{\times}$, Thus when the lever $d$ is drawn as above stated the rod $l$ is drawn in the direction of the arrow, and the lever $a^4$ turned about its pivot $a^5$ with the effect that the link $a^3$ is drawn so as to cause the block carried thereby to contact with the wheel, while the link $a^2$ is also drawn so as to cause the block carried by the same to contact with the wheel on the opposite side. The pivot $a^5$ permittting the necessary relative movement to enable the blocks to efficiently act on the periphery of the wheel, this being the action under the ordinary conditions, whereby full pressure is available for applying the brake blocks or shoes to the wheel, and the arm $g$ and the rack $g'$ move without impediment, the pawl $h$ as previously explained remaining in the position of disengagement from the rack $g'$ as shown.
According to Figs. 3 and 4 which illustrate an example of the invention as applied to the Westinghouse system, the double bell crank lever $b$ is adapted to operate the ratchet arm $g$ by means of the rod or lever $c$ the pivoted extension $c'$ of which carries the pawl $h$; a retarding effect being thereby obtainable to overcome the direct pressure on the brake blocks when the force is applied thereto from the cylinder $e'$ through the lever $d'$ and rod $l$.

In applying the invention to a bogie it is necessary to provide for turning movement and in this connection it is preferred to hinge the rod or lever $c$ as shown at $c^{\times}$ (Figs. 5 and 6) and to arrange the stop $i$ upon a hinged carrier $i'$ adapted to follow the movements of the rod or lever $c$. In this arrangement the blocks $a$ may be suspended from the double bell crank lever $b$ by means of the bent link or bar $a^{\times}$. The rod or lever $c$ may be arranged to carry the pawl $h$ for engaging with the teeth of the arm $g$, the latter actuated by the piston as previously described. The operation of the retarding device will however be readily understood from the description of the previous arrangements and therefore further reference thereto is unnecessary.

By the means hereinbefore described a maximum retardation is attained at all speeds, the brake block pressure is much greater at higher speeds and automatically decreases as the speed is reduced and the coefficient of friction increased. The said retarding effect is not subject to any variation as the result of the fluctuation of the cylinder pressure, the maximum power being always available in case of emergency. It automatically adapts itself for application in an equally effective manner at high or low speeds whether made intentionally accidentally or through the rupture of the train. It obviates the necessity for any skill on the part of the driver in applying, and, properly proportioned, effects the quickest and shortest stops possible without danger of exceeding the retardation possible without either skidding the wheels or producing shocks liable to break or rupture the couplings. The final shock of the carriages upon coming to rest is entirely prevented or considerably minimized.

Although in the foregoing description I have referred to a brake operated by a pressure cylinder, I wish it to be understood that my invention is equally capable of use with brakes operated by other means.

What I claim and desire to secure by Letters Patent of the United States is:—

1. In a brake for railway and other vehicles, brake mechanism, means for applying the same, and governing mechanism independent of the brake mechanism and controlling the latter and operative by the tangential pull on the brake mechanism and acting by opposing in a varying degree the direct force of the brake blocks against the wheels.

2. A brake for railway and other vehicles having brake blocks, means for operating the same, and a governing device therefor operative by the tangential pull on the brake blocks after a predetermined amount of the said tangential pull has been reached and acting by opposing in a varying degree the direct force of the brake blocks against the wheels, 3. Brake mechanism for railway and other vehicles comprising brake blocks, means for actuating the latter, and means for controlling the said actuating means operative by the tangential pull on the brake blocks to govern the application of brake pressure by directly opposing in a varying degree the force of pressure exerted by the actuating means.

4. Brake mechanism for railway and other vehicles having brake applying means, and means coöperative therewith and actuated by the tangential pull on the brake blocks for varying by a greater or lesser degree of opposition the pressure exerted by the brake applying means.

5. Brake mechanism for railway and other vehicles, comprising one or more brake blocks supported by the vehicle, a brake cylinder, a piston within the cylinder having a piston rod, a double bell crank lever coöperative with the brake blocks, and a rod flexibly connected to said bell crank lever and with the piston rod, 6. Brake mechanism for railway and other vehicles, comprising a double bell crank lever, brake blocks coöperative with the bell crank lever, a rod having a pivotal extension, a pawl carried by said extension, and a ratchet arm associated with the brake mechanism and adapted for operation by the said rod.

7. In a brake mechanism for railway and other vehicles, a brake cylinder having a piston movable therein, a piston rod associated with said piston, brake blocks having connection with the piston rod, a bell crank lever associated with the brake blocks, a rod connected to the bell crank lever and having an extension, a pawl carried by the extension, a ratchet arm operative by the piston rod and for engagement with the pawl for governing, by the tangential pull on the brake after a predetermined amount of said tangential pull has been reached, the pressure on the brake blocks and tension means of a predetermined power adapted to be overcome by the aforesaid tangential pull, whereupon the said governing means are operative to check the piston.

8. In a brake mechanism for railway and other vehicles, a brake cylinder having a piston movable therein, a piston rod associated with said piston, brake blocks having connection with the piston rod, a bell crank lever associated with the brake blocks, a rod connected to the bell crank lever and having an extension, a pawl carried by the extension, a ratchet arm operative by the piston rod and for engagement with the pawl for governing by the tangential pull of the brake blocks after a predetermined amount of said tangential pull has been reached the pressure on the brake blocks, tension means of a predetermined power adapted to be overcome by the aforesaid tangential pull, whereupon the said governing means are operative to check the piston, and a stop for engagement with the pawl to release the latter when the bell crank lever has returned to normal position.

9. A brake mechanism having brake blocks, means for actuating the latter, and independent means operative by the tangential pull on the said brake blocks for controlling said actuating means to govern the application of brake pressure by directly opposing more or less the force of pressure over a predetermined amount thereof imparted to the brake by the actuating means.

10. The combination with brake block applying mechanism for railway and other vehicles, of mechanism associated with said brake block applying mechanism for governing, by the tangential pull of the brake blocks after a predetermined amount of tangential pull has been reached, the direct pressure incidental to the application of the brake, thereby regulating the same.

11. In combination with brake block applying mechanism for railway and other vehicles, of means coöperative therewith and brought into action by the tangential pull for governing directly the pressure on the brake blocks.

12. In combination with brake block applying mechanism for railway and other vehicles, of means coöperative therewith and brought into action by a tangential pull on the brake blocks for governing directly the brake block pressure and tension means for weighing the point at which the governing action commences.

13. In brake mechanism, a brake block applying means, and means coöperative therewith and actuated by the tangential pull on the blocks for counteracting in a varying degree the pressure on the latter.

14. In brake mechanism, a brake block applying means, a bell crank lever associated with the brake blocks, a ratchet arm operative with the brake block applying means, a rod connected to the bell crank lever and having an extension, a pawl carried by the extension for engagement with the ratchet arm to regulate the brake applying means for preventing the tangential pull on the brake blocks becoming in excess of a predetermined amount, and a stop for releasing the pawl from engagement with the ratchet arm when the excess of tangential pull has been overcome.

In testimony whereof I have hereunto set my hand in presence of two subscribing witnesses this twenty sixth day of June, 1905.

HARVEY EZRA BROWN.

Witnesses:
T. SELLY WARDLE,
WALTER J. SKERTEN.